J. G. JACKSON.
BAKING PAN.
APPLICATION FILED APR. 26, 1918.
1,302,662.
Patented May 6, 1919.
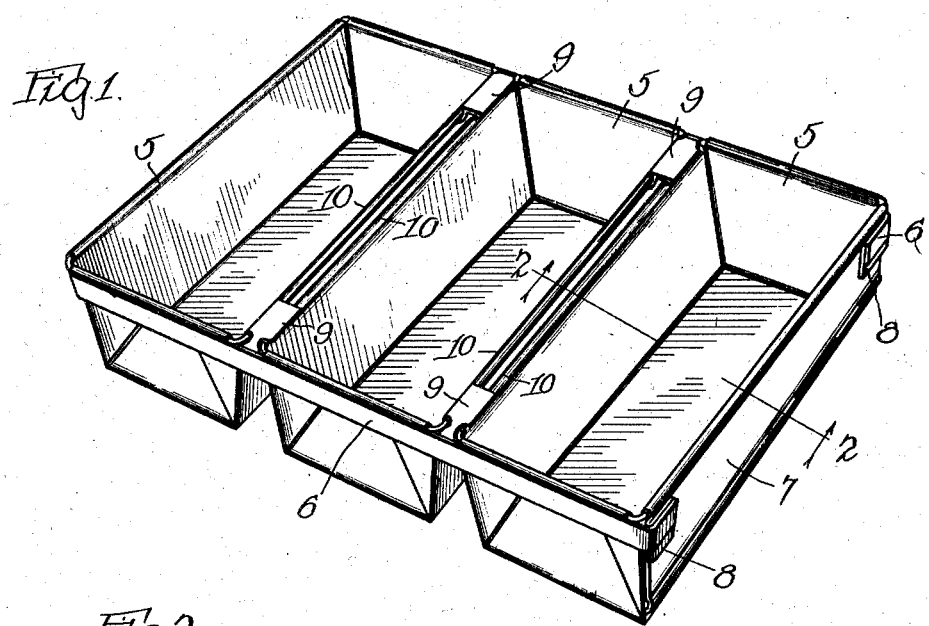
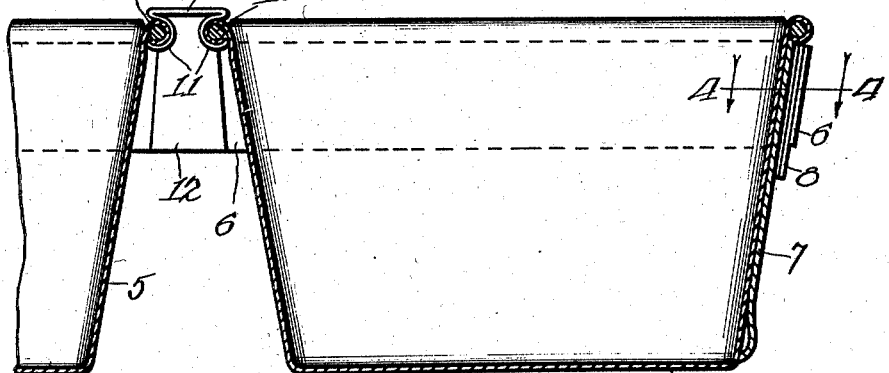
WITNESS:
Leo J. Dutman
INVENTOR.
Joseph George Jackson,
BY Brown & Nissen
ATTORNEYS

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,302,662.          Specification of Letters Patent.      Patented May 6, 1919.

Application filed April 26, 1918. Serial No. 230,868.

*To all whom it may concern:*

Be it known that I, JOSEPH GEORGE JACKSON, a citizen of the United States, residing at Chicago, in the county of Cook and State of Illinois, have invented certain new and useful Improvements in Baking-Pans, of which the following is a specification.

My invention relates to multiple baking pans such as used by bakers, and the like, and the object of this improvement is the provision of a simple and efficient baking pan of the character mentioned, and one which is durable and easily kept clean and sanitary.

Other objects will appear hereinafter.

An embodiment of my invention is shown in the accompanying drawing, forming a part of this specification, and in which—

Figure 1 is a perspective view of a multiple baking pan embodying my invention.

Fig. 2 is an enlarged section taken on line 2—2 of Fig. 1.

Fig. 3 is a perspective view of a pan-securing member used in the construction; and Fig. 4 is a fragmental section taken on line 4—4 of Fig. 2.

Referring more particularly to the drawing, I have shown a multiple baking pan made up of three unit pans 5. It will be understood that more than or less than three pans may be used in a multiple baking pan embodying my invention when so desired. It will be apparent that the frame inclosing the pans will be made to suit the required number.

The frame of my construction is preferably made up of two side bars 6 disposed across the ends of all of the pans close up under the rims of the latter, as clearly indicated in the drawing. At the sides of the outermost pans 5, I provide end plates 7 which preferably cover the remote sides of said end pans, substantially as indicated in Fig. 2. The end plates 7 are provided with ears 8 on their upper end edges which are folded back, when the pan construction is complete, and the end portions of bars 6 fold over on the ears 8 and secured thereto. I preferably secure the ears 8 and the ends of the bars 6 together by welding, soldering, brazing, or other familiar manner to make a rigid joint between them. I preferably secure the pans 5 in the frame 6—7 by members 9. Each of the members 9 preferably has a plane portion 13 with its lateral edges 11 turned sharply under it and curved more than halfway around the adjacent rims 10 of the pans 5. The metal of members 9 is preferably of a thickness and strength so that the parts 9 may be clamped around on the wired rims 10 and retain a hold on such rims to securely hold the member 9 onto the rims of the pans. Each member 9 is provided with a portion 12 which engages a bar 6 and is preferably secured thereto by welding, soldering, brazing, or the like. The parts 12 are preferably placed on the inner sides of the bars 6 so that the outer sides of said bars will be smooth. When the outer sides of the bars 6 are provided without irregularities the pans are more easily handled since they will not catch on each other in moving them about.

While I have illustrated and described the preferred form of my invention, I do not desire to be limited to the precise details set forth, but desire to avail myself of such variations and changes as come within the scope of the appended claims.

I claim:

1. A multiple baking pan comprising a frame; a plurality of pans disposed in said frame with their rims adjacent said frame; and members near the ends of and between said pans having portions extending more than half way around and clamped on the rims of the pans, said members being welded to said frame.

2. A multiple baking pan frame comprising two substantially parallel end plates; ears attached to the ends of said end plates and disposed against the remote sides of said end plates; and side bars extending between the ends of said end plates and having their ends disposed against the remote sides of said ears and welded to the latter.

3. A multiple baking pan comprising a plurality of pans; end plates disposed on the remote sides of the outermost pans; ears on the end plates folded back on the outer sides of the latter; bars disposed at the ends of all of the pans with their ends folded around on and secured to said ears; and means securing the pans to said bars.

4. A multiple baking pan comprising a plurality of pans having wired rims; a frame extending around said pans close up under said wired rims; and members having end portions disposed on and secured to the inner sides of said frame providing a smooth surface at the outer side of the frame, there being portions of said members disposed between the end portions of the pans and secured to the latter.

5. A pan-securing member for multiple baking pans comprising a sheet metal member having a narrow plane portion with portions at the longitudinal edges of the plane portion bent back sharply on the latter and curved through more than half circles providing pan clamps and a portion at the end of the plane portion disposed at an angle to the latter providing a frame-engaging portion.

6. A pan securing member for multiple baking pans comprising sheet material having a narrow plane portion with portions at the longitudinal edges of said plane portion adapted to be clamped on pan rims; and a portion at one end of said plane portion disposed at an angle to the latter and providing a frame engaging portion.

7. A pan securing member for multiple baking pans comprising an irregular piece of sheet metal cut out and formed with a narrow central plane portion with portions at the longitudinal edges of said plane portion bent back sharply under the edges of the latter and disposed in curves extending through more than half circles providing clamps adapted to engage the wired rims of pans, and a portion disposed at an angle to said plane portion adapted to lie flat against a pan frame.

In testimony whereof I have signed my name to this specification on this 20th day of April, A. D. 1918.

JOSEPH GEORGE JACKSON.